US011548386B2

(12) United States Patent
Deyell

(10) Patent No.: US 11,548,386 B2
(45) Date of Patent: Jan. 10, 2023

(54) SYSTEM AND METHOD FOR OPERATING A VEHICLE-EQUIPPED POWER TAKE-OFF UNIT

(71) Applicant: Deyell Contracting Ltd., Wainwright (CA)

(72) Inventor: Sheldon Deyell, Wainwright (CA)

(73) Assignee: DEYELL CONTRACTING LTD., Wainwright (CA)

( * ) Notice: Subject to any disclaimer, the term of this patent is extended or adjusted under 35 U.S.C. 154(b) by 11 days.

(21) Appl. No.: 17/176,836

(22) Filed: Feb. 16, 2021

(65) Prior Publication Data
US 2022/0258605 A1 Aug. 18, 2022

(51) Int. Cl.
*B60K 25/06* (2006.01)
*B60K 17/28* (2006.01)
*F16D 48/06* (2006.01)
*F16D 125/58* (2012.01)
*F16D 125/60* (2012.01)

(52) U.S. Cl.
CPC .............. *B60K 25/06* (2013.01); *B60K 17/28* (2013.01); *F16D 48/06* (2013.01); *F16D 2125/587* (2013.01); *F16D 2125/60* (2013.01); *F16D 2500/1028* (2013.01); *F16D 2500/10437* (2013.01)

(58) Field of Classification Search
CPC ......... B60K 25/06; B60K 17/28; F16D 48/06; F16D 2125/587; F16D 2125/60; F16D 2500/1028; F16D 2500/10437
See application file for complete search history.

(56) References Cited

U.S. PATENT DOCUMENTS

| 6,286,987 | B1 | 9/2001 | Goode et al. |
| 6,386,303 | B1 | 5/2002 | Zibuschka et al. |
| 6,935,474 | B2 | 8/2005 | Bell et al. |
| 7,784,554 | B2 | 8/2010 | Grady et al. |
| 8,100,811 | B2 | 1/2012 | Karlsson et al. |
| 9,284,993 | B1 | 3/2016 | Kalinsky et al. |
| 9,416,827 | B1 | 8/2016 | Logan et al. |
| 2003/0024782 | A1* | 2/2003 | Hrazdera ............... B60K 25/06 74/15.66 |
| 2004/0195069 | A1* | 10/2004 | Bell ...................... F16D 48/066 74/11 |

(Continued)

FOREIGN PATENT DOCUMENTS

| EP | 1293113 A2 * | 3/2003 | ........... A01B 61/025 |
| EP | 1672236 A1 * | 6/2006 | ............. B60K 25/00 |

(Continued)

OTHER PUBLICATIONS

Petrillo, Alan M. "The Amazing, Shirking Apparatus Pump Panel" Fire Apparatus & Emergency Equipment, Sep. 13, 2017. Retrieved from: https://www.fireapparatusmagazine.com/2017/09/13/the-amazing-shrinking-apparatus-pump-panel/#gref.

(Continued)

*Primary Examiner* — James A English
*Assistant Examiner* — Scott F. Underwood
(74) *Attorney, Agent, or Firm* — Gowling WLG (Canada) LLP

(57) ABSTRACT

The present disclosure provides a system and methods for operating a power take-off unit of a vehicle from outside of a passenger cabin of the vehicle to power an auxiliary component.

22 Claims, 2 Drawing Sheets

(56) References Cited

U.S. PATENT DOCUMENTS

| | | | |
|---|---|---|---|
| 2006/0196284 A1 | 9/2006 | Tarasinski et al. | |
| 2009/0305845 A1 * | 12/2009 | Karlsson | B60W 10/30 477/79 |
| 2013/0068046 A1 * | 3/2013 | Mettler | B60K 17/28 74/15.82 |

FOREIGN PATENT DOCUMENTS

| | | | |
|---|---|---|---|
| JP | 5092189 B2 | 12/2012 | |
| WO | WO-2018212702 A1 * | 11/2018 | B60K 17/06 |
| WO | WO-2021072121 A1 * | 4/2021 | A62C 27/00 |

OTHER PUBLICATIONS

Waterous. TC21 Series Power Take-Off Operation and Maintenance Instructions. Issued Sep. 24, 2020. Retrieved from: https://www.waterousco.com/media/pdfs/T-370.pdf.

* cited by examiner

SYSTEM AND METHOD FOR OPERATING A VEHICLE-EQUIPPED POWER TAKE-OFF UNIT

TECHNICAL FIELD

The present disclosure generally relates to operating a power take-off unit of a vehicle from outside of the passenger cabin of the vehicle. In particular aspects of the present disclosure, operating the power take-off unit may modulate a pump.

BACKGROUND

Power take-off (PTO) units are used to transfer power from a power source, such as a running engine, to an auxiliary component. Vehicles such as trucks may be equipped with a PTO unit during or after manufacture. For example, a vocational truck may be equipped with a PTO unit to divert engine power away from the drive shaft and power an independent component such as a pump.

Vehicle-equipped PTO units are operated from within the passenger cabin of the vehicle, (e.g. a cab of a truck), and therefore an operator may not be able to effectively monitor the auxiliary component during engagement. This is particularly problematic in, for example, the case of PTO-driven pumps for fluid handling, as not being able to monitor hoses during pump engagement can result in undesired and potentially dangerous spills or leakage. Further, onset of operator fatigue from climbing in and out of the vehicle between operating the PTO unit and working with the auxiliary component increases the risk of injury and operational error.

Therefore, there exists a need for improved systems and methods for operating a PTO unit of a vehicle.

SUMMARY

The present disclosure provides systems and methods for operating a power take-off (PTO) unit of a vehicle. The present disclosure recognizes that there are problems in the current PTO technology in respect of operational safety and efficiency.

An advantage of the present disclosure is the provision of systems and methods for operating PTO units having improved characteristics over existing technologies.

In an embodiment, the present disclosure relates to a system for operating a power take-off unit of a vehicle from outside of a passenger cabin of the vehicle, the system comprising: an actuator control apparatus for modulating a linkage for a transmission clutch of the vehicle; a power take-off control apparatus for engaging and disengaging a power take-off unit to a transmission of the vehicle; and a control module located outside of the passenger cabin of the vehicle for controlling the function of the actuator control apparatus and the power take-off control apparatus.

In an embodiment, the present disclosure relates to a method for operating a power take-off unit of a vehicle from outside of a passenger cabin of the vehicle, the method comprising: initiating an active mode power take-off status for the power take-off unit of the vehicle; activating an actuator control apparatus from a control module located outside of a passenger cabin of the vehicle to disengage a transmission clutch of the vehicle; activating a power take-off control apparatus from the control module to engage the power take-off unit to a transmission of the vehicle in a configuration to drive the power take-off unit in a forward or reverse direction; and deactivating the actuator control apparatus from the control module to engage the transmission clutch and cause the power take-off to be in the active mode.

In an embodiment, the present disclosure relates to a kit for operating a power take-off unit of a vehicle from outside of a passenger cab of the vehicle, the kit comprising: an actuator control apparatus for modulating a linkage for a transmission clutch; a power take-off control apparatus for engaging and disengaging the power take-off unit to a vehicle transmission; and a control module to be located outside of a passenger cabin of a vehicle for controlling the function of the actuator control apparatus and the power take-off control apparatus.

Other aspects and embodiments of the disclosure are evident in view of the detailed description provided herein.

BRIEF DESCRIPTION OF THE DRAWINGS

Further advantages, permutations and combinations of the invention will now appear from the above and from the following detailed description of the various particular embodiments of the invention taken together with the accompanying drawings, each of which are intended to be non-limiting, in which.

DETAILED DESCRIPTION

Figure 1:
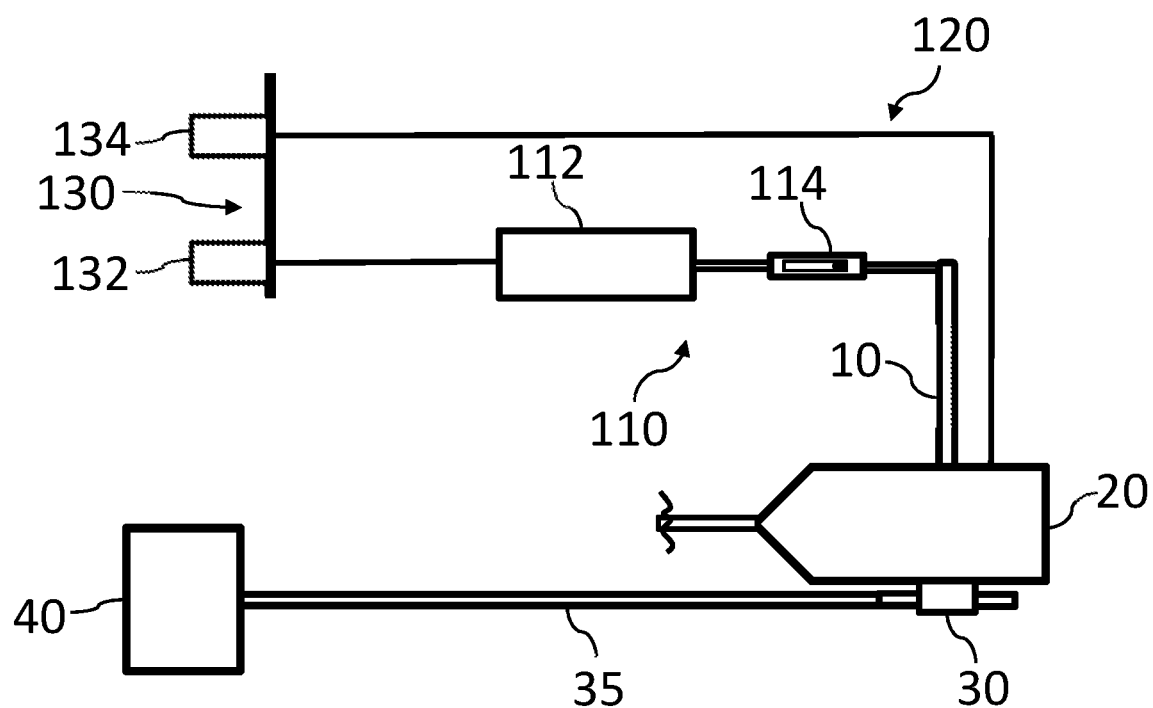
FIG. 1 is a schematic of an exemplary system of the present disclosure.
Figure 2:
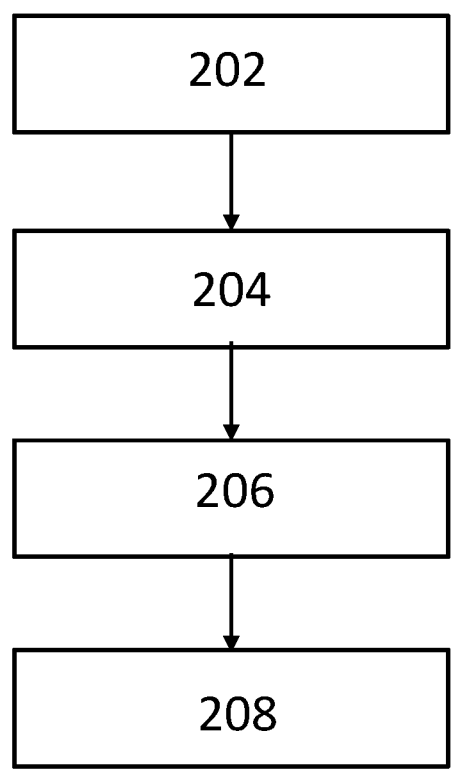
FIG. 2 is a schematic of an exemplary method of the present disclosure.

Unless otherwise defined, all technical and scientific terms used herein generally have the same meaning as commonly understood by one of ordinary skill in the art to which this disclosure pertains. Exemplary terms are defined below for ease in understanding the subject matter of the present disclosure.

Definitions

The term "a" or "an" refers to one or more of that entity; for example, "a control module" refers to one or more control modules or at least one control module. As such, the terms "a" (or "an"), "one or more" and "at least one" are used interchangeably herein. In addition, reference to an element or feature by the indefinite article "a" or "an" does not exclude the possibility that more than one of the elements or features are present, unless the context clearly requires that there is one and only one of the elements. Furthermore, reference to a feature in the plurality (e.g. control modules), unless clearly intended, does not mean that the system or methods disclosed herein must comprise a plurality.

"And/or" refers to and encompasses any and all possible combinations of one or more of the associated listed items (e.g. one or the other, or both), as well as the lack of combinations when interrupted in the alternative (or).

"Comprise" as is used in this description and in the claims, and its conjugations, is used in its non-limiting sense to mean that items following the word are included, but items not specifically mentioned are not excluded.

Power Take-Off Operation Systems and Methods

The technology of the present disclosure may be suitable for several applications of vehicle-equipped power take-off (PTO) units. The disclosure herein largely discusses the technology in the context of a PTO unit of a vehicle for powering an auxiliary pump, but it will be appreciated that other applications are equally applicable.

As used herein, the terms "power take-off unit" or "PTO unit" or "PTO" may be used interchangeably and are meant to refer to a device that transfers the mechanical power of an engine to another piece of equipment such as without limitation an auxiliary pump.

The present disclosure provides advantageous PTO unit operation systems and improved methods of operation in respect of vehicles equipped with a PTO.

One advantage of the present disclosure is the provision of systems and methods for operating a PTO unit of a vehicle having improved characteristics over existing technologies.

Another advantage of the present disclosure is the provision of systems for operating a PTO unit that permit operation of the PTO unit from outside the passenger cab of the vehicle.

A further advantage of the present disclosure is reducing the amount of times an operator needs to enter and exit the passenger cabin of a vehicle to operate the PTO unit and auxiliary device, which may reduce operator fatigue.

The above advantages allow for the provision of systems and methods for operating a PTO unit of a vehicle that enhance safety and increase efficiency of operating an auxiliary component, such as a pump.

Still other advantages and benefits of the systems and methods for operating a PTO unit will become apparent to those skilled in the art upon a reading and understanding of the following detailed description.

Reference will now be made in detail to exemplary embodiments of the disclosure, wherein numerals refer to like components, examples of which are illustrated in the accompanying drawings that further show exemplary embodiments, without limitation.

Systems for Operating a Power Take-Off Unit

In an embodiment, the present disclosure relates to a system for operating a power take-off unit of a vehicle from outside of a passenger cabin of the vehicle, the system comprising: an actuator control apparatus for modulating a linkage for a transmission clutch of the vehicle; a power take-off control apparatus for engaging and disengaging a power take off unit to a transmission of the vehicle; and a control module located outside of the passenger cabin of the vehicle for controlling the function of the actuator control apparatus and the power take-off control apparatus.

FIG. 1 is a schematic of an exemplary embodiment of system 100 of the present disclosure. In an embodiment, the system 100 comprises an actuator control apparatus 110, a power take-off control apparatus 120, and a control module 130.

The actuator control apparatus 110 may be mounted, for example, on or to the vehicle chassis. In an embodiment, the actuator control apparatus 110 comprises an actuator 112 operatively coupled to the linkage for the transmission clutch 10 by a telescopic joint 114. As used herein, the term "telescopic joint" is intended to refer to a mechanical connection that comprises a linearly extendible and retractable piece that may be extended by activating the actuator 112 and retracted by deactivating the actuator 112. The actuator 112 may be any suitable linear actuator, such as a pneumatic, hydraulic, or electric actuator. In an embodiment, the actuator 112 is a pneumatic actuator. In a particular embodiment, the actuator 112 is an air ram.

In an embodiment, the telescopic joint 114 is a slip joint, such as shown in FIG. 1. As used herein, the term "slip joint" is intended to refer to a mechanical connection configured to both join the motion of the connected components and to allow for independent motion of the connected components. For example, in the context of the present disclosure, the slip joint may permit independent operation of the linkage for the transmission clutch 10 either by activation of the actuator control apparatus 110 from the control module 130 outside the vehicle cab (e.g. to operate the PTO unit) or from a clutch pedal inside the vehicle cab (e.g. to drive the vehicle). In an embodiment, and without limitation, the slip joint is a ball-and-socket joint, a bolt-and-groove joint, or a cable-operated joint.

In an embodiment, the actuator control apparatus 110 can modulate a linkage for a transmission clutch 10 of a vehicle (not shown) connected to the transmission 20 of an engine. By "modulate a linkage for a transmission clutch" it is meant that the actuator control apparatus 110 can vary the position of the linkage for the transmission clutch 10 such that the transmission clutch is engaged or disengaged. In an embodiment, modulating the linkage for the transmission clutch 10 is by activating the actuator 112 and extending the telescopic joint 114, e.g. to disengage the clutch. In an embodiment, modulating the linkage for the transmission clutch 10 is by deactivating the actuator 112 and retracting the telescopic joint 114, e.g. to engage or re-engage the clutch. As mentioned above, in particular embodiments, the telescopic joint 114 enables the operator to use the clutch pedal inside the vehicle to independently modulate the linkage for the transmission clutch 10 for example when driving the vehicle.

The control module 130 is located outside of the passenger cabin of the vehicle. As used herein, the term "control module" is intended to refer to a panel or an area that comprises an actuator control device 132 and a power take-off control device 134. In an embodiment, the control module 130 is a single panel comprising both the actuator control device 132 and the power take-off control device 134. In some embodiments, the a control module 130 comprises two panels, each panel comprising one of either the actuator control device 132 or the power take-off control device 134. In these embodiments, the two panels are located in proximity to each other such the actuator control device 132 and the power take-off control device 134 are both in reach of an operator. In some embodiments, the control module 130 may further comprise operational control devices for auxiliary components driven by the power take-off unit, such as for example a pump. These control devices for the auxiliary components may, for example, provide on/off controls, speed adjustment controls, and other operational controls for the auxiliary component.

In an embodiment, the actuator control device 132 is configured to activate and deactivate an actuator 112. In an embodiment, the actuator control device 132 is connected to the actuator 112 electronically, mechanically, or by a combination of both modes. In an embodiment, the actuator control device 132 is connected to and operates the actuator 112 electronically. The actuator control device 132 may be any suitable device such as but not limited to a switch, a button, or a control knob or joystick. In a particular embodiment, the actuator control device 132 is a switch, such as an on/off switch. In a further embodiment, the actuator control device 132 is an electrical switch. In an embodiment, the actuator control device 132 may be moved from a first position (e.g. off position) to a second position (e.g. on position) to activate the actuator 112, causing the telescopic joint 114 (e.g. a slip joint) to move to an extended position, modulating the linkage for the transmission clutch 10, and thereby disengaging the transmission clutch of the vehicle. In an embodiment, the actuator control device 132 may be moved from the second position to the first position to deactivate the actuator 112, causing the telescopic joint 114 to move to a retracted position and thereby engaging the transmission clutch of the vehicle by modulating the linkage for the transmission clutch 10.

The power take-off control apparatus 120 functions to control the engagement and disengagement of the power take-off unit to the drive train of the vehicle, i.e. to take power therefrom. In an embodiment, the power take-off control apparatus 120 is an electrical system, a mechanical system, or a combination of both an electrical and mechanical system that operates the engagement and disengagement of the power take-off unit to the transmission of the vehicle. Irrespective of design, the power take-off control apparatus 120 operationally engages and disengages one or more gears of the transmission (not shown) to the power take-off unit to provide power to the power take-off unit.

In an embodiment, the power take-off control device 134 is connected to the power take-off control apparatus 120 electronically, mechanically, or by a combination of both modes. In an embodiment, the power take-off control device 134 is connected to the power take-off control apparatus 120 electronically. The power take-off control device 134 may be any suitable device such as but not limited to a switch, a button, or a control knob or joystick. In an embodiment, the power take-off control device 134 is a multi-directional switch or multi-function push button. In an embodiment, the power take-off control device 134 is a multi-directional switch. In an embodiment, the power take-off control device 134 has modes or control means for selecting forward, neutral, and reverse power modes for the power take-off unit 30.

In an embodiment, the power take-off control device 134 may be configured to modulate the engagement and disengagement of one or more gears of the transmission. In an embodiment, the power take-off control device 134 selectively modulates engagement of the power take-off unit 30 to the transmission to drive the power take-off unit 30 in a forward or in a reverse direction. By "selectively modulate" it is meant that the operator has control of and/or can choose the direction in which the power take-off unit 30 is driven. In an embodiment, the power take-off control device 134 modulates disengagement of the power take-off unit 30 to the transmission to put the power take-off unit 30 in a non-powered mode (e.g. neutral).

In an embodiment, the power take-off unit 30 is operatively coupled to an auxiliary piece of equipment 40 by a drive shaft 35. The auxiliary piece of equipment 40 may be any piece of equipment that can be driven by a power take-off unit such as, but not limited to, a pump (e.g. a fluid pump), a mixer, wood chipper, or a lifting apparatus (e.g. a mechanical arm). In a particular embodiment, the auxiliary piece of equipment 40 is a fluid pump.

In embodiments where the auxiliary piece of equipment 40 is a fluid pump, driving the power take-off unit 30 in a forward direction may engage the pump to take in fluid (e.g. load the pump or storage container). In an embodiment, driving the power take-off unit 30 in a reverse direction may engage the pump to expel fluid (e.g. unload the pump or storage container). The skilled person will appreciate that the forward and reverse directions of the power take-off unit 30 may have the opposite effects depending on the configuration of the pump.

Methods

In another aspect, the present disclosure provides methods for operating a power take-off unit of a vehicle from outside of a passenger cabin of the vehicle. While the methods discussed herein are in the context of operating the power take-off unit to drive a fluid pump, it will be appreciated that other applications are equally applicable.

In an embodiment, the present disclosure relates to a method 200 for operating a power take-off unit of a vehicle from outside of a passenger cabin of the vehicle, the method comprising: initiating an active mode power take-off status for the power take-off unit of the vehicle (202); activating an actuator control apparatus from a control module located outside of a passenger cabin of the vehicle to disengage a transmission clutch of the vehicle (204); activating a power take-off control apparatus from the control module to engage the power take-off unit to a transmission of the vehicle in a configuration to drive the power take-off unit in a forward or reverse direction (206); and deactivating the actuator control apparatus from the control module to engage the transmission clutch and cause the power take-off to be in the active mode (208).

In an embodiment, the initiating step 202 may comprise operating a lever, button, switch or equivalent component. The initiating step 202 may be performed inside or outside the passenger cabin of the vehicle to disengage the drive shaft and engage the power take-off unit 30 into an active mode power take-off status. By "active mode power take-off status", it is meant that the system and/or vehicle is in a state in which the power take-off unit can become engaged to the power source by further action. In an embodiment, the lever, button, switch or equivalent may be located on the floor of the passenger cabin. In an embodiment, the initiating step 202 is from within the passenger cabin of the vehicle. In such embodiments, an operator may exit the passenger cabin of the vehicle after the initiating step 202. Alternatively, the initiating step 202 may be performed from outside of the passenger cabin of the vehicle.

In an embodiment, the activating step 204 is by operating the actuator control device 132 described elsewhere herein from the control module 130 outside of the passenger cabin of the vehicle. In an embodiment, the activating step 204 is by moving the actuator control device 132 from a first position (e.g. off position) to a second position (e.g. on position). In an embodiment, activating the actuator control apparatus 110 comprises activating an actuator 112 to modulate the linkage for the transmission clutch 10 via a telescopic joint 114 described elsewhere herein to disengage the transmission clutch of the vehicle. In an embodiment, the telescopic joint 114 is a slip joint.

In an embodiment, the activating step 206 is by operating power take-off control device 134 described elsewhere herein from the control module 130 outside of the passenger cabin of the vehicle. In an embodiment, the activating step 206 is by moving the power take-off control device 134 from a first position (e.g. a neutral position) to a second position (e.g. a forward or reverse gear position). In an embodiment, the activating step 206 drives the power take-off unit in a forward direction to engage a pump to take in fluid. In an embodiment, the activating step 206 drives the power take-off unit in a reverse direction to engage a pump to expel fluid. The skilled person will appreciate that the forward and reverse directions of the power take-off unit 30 may have the opposite effects depending on the configuration of the pump.

In an embodiment, the deactivating step 208 is by moving the actuator control device 132 from the second position to the first position at the control module 130, to thereby re-engage the clutch and transfer power from the engine of the vehicle to the power take-off unit 30.

Kits

In another aspect, the present disclosure provides a kit to allow for operating a power take-off unit of a vehicle from outside of a passenger cab of the vehicle. The kit may for example be used to retrofit a system as described herein to a vehicle already having a power take-off unit or a vehicle on which a power take-unit is also be installed.

In an embodiment, the kit comprises: an actuator control apparatus 110 for modulating a linkage for a transmission clutch 10; a power take-off control apparatus 120 for engaging and disengaging the power take-off unit 30 to a vehicle transmission 20; and a control module 130 to be located outside of a passenger cabin of a vehicle for controlling the function of the actuator control apparatus 110 and the power take-off control apparatus 120. In an embodiment, the kit is to be used with a vehicle equipped with a power take-off unit 30.

In an embodiment of the kits disclosed herein, the actuator control apparatus 110 comprises an actuator 112 and a telescopic joint 114. In an embodiment, the actuator 112 is an air ram and the telescopic joint 114 is a slip joint.

In an embodiment of the kits disclosed herein, the power take-off control apparatus 120 comprises an electronic and/or mechanical mode of operation for engaging the power take-off unit 30 to one or more gears of the transmission 20.

In an embodiment of the kits disclosed herein, the control module 130 comprises an actuator control device 132 and a power take-off control device 134 for operating the actuator control apparatus 110 and power take-off control apparatus 120, respectively. In an embodiment, the kit comprises an electronic and/or mechanical mode of operation for engaging the power take-off unit 30 to one or more gears of the transmission 20.

In an embodiment, the kit further comprises a power take-off unit 30 for a vehicle not previously equipped with such unit.

In an embodiment, the kit further comprises a pump 40 to be operatively coupled to the power take-off unit 30.

Many obvious variations of the embodiments set out herein will suggest themselves to those skilled in the art in light of the present disclosure. Such obvious variations are within the scope of the appended claims.

The invention claimed is:

1. A system for operating a power take-off unit of a vehicle from outside of a passenger cabin of the vehicle, the system comprising:
    an actuator control apparatus for modulating a linkage for a transmission clutch of the vehicle;
    a power take-off control apparatus for engaging and disengaging the power take-off unit to one or more gears of a transmission of the vehicle; and
    a control module located outside of the passenger cabin of the vehicle for controlling the function of the actuator control apparatus and the power take-off control apparatus,
    wherein the control module comprises a power take-off control device that selectively modulates engagement of the power take-off unit to the one or more gears of the transmission to drive the power take-off unit in a forward or reverse direction.

2. The system of claim 1, wherein the actuator control apparatus comprises an actuator operatively coupled to the linkage for the transmission clutch.

3. The system of claim 2, wherein the actuator is a pneumatic actuator.

4. The system of claim 3, wherein the pneumatic actuator is an air ram.

5. The system of claim 2, wherein the actuator is operatively coupled to the linkage for the transmission clutch by a telescopic joint.

6. The system of claim 5, wherein the telescopic joint is a slip joint.

7. The system of claim 6, wherein the slip joint is a ball-and-socket joint, a bolt-and-groove joint, or a cable-operated joint.

8. The system of claim 2, wherein the control module comprises an actuator control device configured to activate and deactivate the actuator.

9. The system of claim 8, wherein the actuator control device is a switch or a button.

10. The system of claim 9, wherein the actuator control device is a switch.

11. The system of claim 1, wherein the power take-off control apparatus comprises a mechanical means to engage the one or more gears of the transmission.

12. The system of claim 1, further comprising a pump operatively coupled to the power take-off unit.

13. A method for operating a power take-off unit of a vehicle from outside of a passenger cabin of the vehicle, the method comprising:
    initiating an active mode power take-off status for the power take-off unit of the vehicle;
    activating an actuator control apparatus from a control module located outside of the passenger cabin of the vehicle to disengage a transmission clutch of the vehicle;
    activating a power take-off control apparatus from the control module to engage the power take-off unit to one or more gears of a transmission of the vehicle in a configuration to drive the power take-off unit in a forward or reverse direction; and
    deactivating the actuator control apparatus from the control module to engage the transmission clutch and cause the power take-off to be in the active mode.

14. The method according to claim 13, wherein activating the actuator control apparatus comprises activating an air ram to modulate a linkage for the transmission clutch via a telescopic joint.

15. The method according to claim 14, wherein the telescopic joint is a slip joint.

16. The method according to claim 13, wherein initiating the active mode power take-off status is from within the passenger cabin of the vehicle.

17. A kit for operating a power take-off unit of a vehicle from outside of a passenger cabin of the vehicle, the kit comprising:
    an actuator control apparatus for modulating a linkage for a transmission clutch;
    a power take-off control apparatus for engaging and disengaging the power take-off unit to one or more gears of a vehicle transmission; and
    a control module to be located outside of the passenger cabin of the vehicle for controlling the function of the actuator control apparatus and the power take-off control apparatus, wherein the control module comprises a power take-off control device for selectively modulating engagement of the power take-off unit to the one or more gears of the transmission to drive the power take-off unit in a forward or reverse direction.

18. The kit of claim 17, wherein the actuator control apparatus comprises an actuator control device; an actuator; and a telescopic joint.

19. The kit of claim 18, wherein the actuator is an air ram and the telescopic joint is a slip joint.

20. The kit of claim 17, wherein the power take-off control apparatus comprises a mechanical means to engage the one or more gears of the transmission.

21. The kit of claim 17, further comprising the power take-off unit.

22. The kit of claim 17, further comprising a pump to be operatively coupled to the power take-off unit.

\* \* \* \* \*